(12) United States Patent
Robbins et al.

(10) Patent No.: US 6,244,891 B1
(45) Date of Patent: Jun. 12, 2001

(54) CIRCUIT BREAKER MOVEMENT STRUCTURE WITH SNAP-ON DRAW BRACKET ASSEMBLY

(75) Inventors: W. Dale Robbins, Lithonia; Pavel N. Lichman, Roswell, both of GA (US)

(73) Assignee: Siemens Energy & Automation, Inc., Alpharetta, GA (US)

( * ) Notice: Subject to any disclaimer, the term of this patent is extended or adjusted under 35 U.S.C. 154(b) by 0 days.

(21) Appl. No.: 09/434,434

(22) Filed: Nov. 5, 1999

(51) Int. Cl.$^7$ ............................. H01R 13/62; H01R 13/64
(52) U.S. Cl. .................. 439/372; 200/50.21; 200/50.01; 361/606
(58) Field of Search ..................................... 439/372, 369, 439/370, 368, 367; 200/50.01, 50.21, 50.23, 50.24, 50.26; 361/606, 607, 608, 609, 610, 825

(56) References Cited

U.S. PATENT DOCUMENTS

| | | | |
|---|---|---|---|
| 3,681,545 | * | 8/1972 | Cellerini et al. ................ 200/50 AA |
| 4,112,269 | * | 9/1978 | Nelson et al. .................. 200/50 AA |
| 4,565,908 | * | 1/1986 | Bould ............................... 200/50 AA |
| 4,761,521 | * | 8/1988 | Beck et al. ....................... 200/50 AA |
| 4,839,477 | * | 6/1989 | Orosz et al. ..................... 200/50 AA |
| 4,914,549 | | 4/1990 | Leone et al. .......................... 361/336 |
| 5,486,663 | * | 1/1996 | Fritsch et al. ...................... 200/50 R |
| 5,486,978 | * | 1/1996 | Fishovitz ............................... 361/617 |
| 5,837,949 | | 11/1998 | Green et al. ....................... 200/50.21 |

* cited by examiner

Primary Examiner—Michael L. Gellner
Assistant Examiner—Kyung S. Lee (57) ABSTRACT

A circuit breaker movement structure 10 is provided for use with a circuit breaker 12 to move the circuit breaker 12 to be connected with or be disconnected from a circuit breaker connecting apparatus 14. The circuit breaker connection apparatus 10 has slot structure 78 in a rear surface. The movement structure 10 comprises bracket assembly constructed and arranged to engage with a circuit breaker to move the circuit breaker with respect to the connecting apparatus. The bracket assembly has a pair of draw brackets 68 and 70 disposed in spaced relation. Each draw bracket includes hook structure 74 constructed and arranged to engage with associated slot structure 78 of the connecting apparatus, and a detent 80 constructed and arranged to engage a surface 82 of the connecting apparatus 14 in an interference fit when the hook structure 74 is engaged in the slot structure 78.

11 Claims, 7 Drawing Sheets

CIRCUIT BREAKER MOVEMENT STRUCTURE WITH SNAP-ON DRAW BRACKET ASSEMBLY

BACKGROUND OF THE INVENTION

The present invention relates to a circuit breaker draw-withdraw apparatus for use with a circuit breaker to move the circuit breaker so as to be connected to or be disconnected from a plug-in base.

Conventionally, a plug-in base for a circuit breaker is mounted on a panel board or other base structure and is wired to circuitry on the base structure. A circuit breaker is installed in the plug-in base by inserting stabs protruding from the circuit breaker into jaws fixed to the plug-in base. The jaw/stab connection provides the primary electrical connection between the circuit breaker and the plug-in base. This connection may also mechanically retain the circuit breaker in the plug-in base.

Withdraw mechanisms have been developed for mechanically drawing a circuit breaker into a plug-in base and withdrawing the circuit breaker from the plug-in base. An example of such a withdraw mechanism is disclosed in U.S. Pat. No. 5,837,949 to Green et al. The withdraw mechanism described in Green et al. is operated by rotating a screw linkage using a drive tool inserted into the front of the withdraw mechanism which draws the circuit breaker into or withdraws the circuit breaker from the plug-in base. This type of mechanism is advantageous since a circuit breaker unit having a high amperage rating is heavy and thus is difficult for a technician to position properly in the plug-in base by hand. In addition, the jaws in a high amp plug-in base may require a high insertion force, making it difficult or impossible for a technician to apply sufficient force to fully insert the stabs into the jaws.

A circuit breaker withdraw mechanism typically includes a component attached to the plug-in base and a component attached to the circuit breaker. Installation of the withdraw mechanism may take place in the field, in a supplier warehouse or at the circuit breaker production plant. Accordingly, there is a need to ensure that attachment of the withdraw mechanism be simple and fool-proof.

SUMMARY OF THE INVENTION

An object of the invention is to fulfill the need referred to above. In accordance with the principles of the present invention, this objective is achieved by providing a circuit breaker movement structure for use with a circuit breaker to move the circuit breaker to be connected with or be disconnected from a circuit breaker connecting apparatus. The circuit breaker connection apparatus has slot structure in a rear surface thereof. The movement structure comprises bracket assembly constructed and arranged to engage with a circuit breaker to move the circuit breaker with respect to the connecting apparatus. The bracket assembly has a pair of draw brackets disposed in spaced relation. Each draw bracket includes hook structure constructed and arranged to engage with associated slot structure of the connecting apparatus, and a detent constructed and arranged to engage a surface of the connecting apparatus in an interference fit when the hook structure is engaged in the slot structure.

In accordance with another aspect of the invention, a method of coupling a draw bracket assembly to a circuit breaker connecting apparatus is provided. The method provides a circuit breaker connecting apparatus having a slot in a surface thereof. A bracket assembly is provided which is constructed and arranged to engage with a circuit breaker to move the circuit breaker with respect to the connecting apparatus. The bracket assembly includes a draw bracket having hook structure, a detent, and a stand-off tab. The method includes engaging the hook structure with the slot in the connecting apparatus, rotating the draw bracket about the hook structure until the detent engages a surface of the connecting apparatus in an interference fit, and continuing rotation of the draw bracket until the stand-off tab abuts the connecting apparatus.

Other objects, features and characteristics of the present invention, as well as the methods of operation and the functions of the related elements of the structure, the combination of parts and economics of manufacture will become more apparent upon consideration of the following detailed description and appended claims with reference to the accompanying drawings, all of which form a part of this specification.

BRIEF DESCRIPTION OF THE DRAWINGS

Preferred embodiments of the invention are described in greater detail herein below with reference to the drawings wherein.

DETAILED DESCRIPTION OF THE PREFERRED EMBODIMENTS

Figure 1:
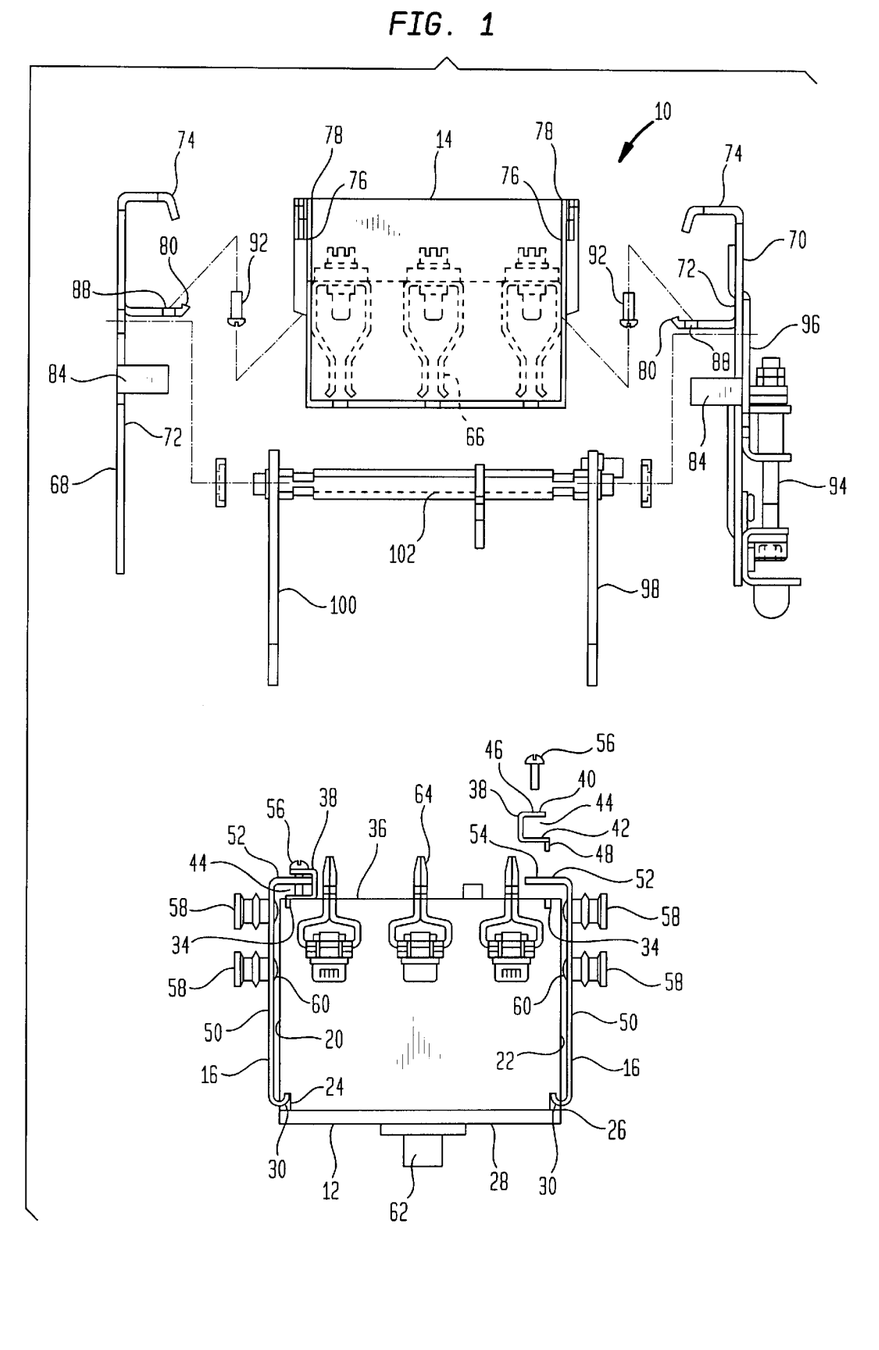
FIG. 1 is a plan and partially exploded view of a circuit breaker movement structure provided in accordance with the principles of the present invention.

With reference to FIG. 1, a circuit breaker movement structure, generally indicated at 10, is provided in accordance with the principles of the present invention. The circuit breaker movement structure is used with a circuit breaker 12 to move the circuit breaker 12 so as to be connected with or be disconnected from a circuit breaker connecting apparatus or plug-in base 14. The movement structure 10 includes a guide assembly comprising a pair of guide brackets 16 constructed and arranged to be mounted adjacent to sides 20 and 22, respectively, of the circuit breaker 12. In the illustrated embodiment, the circuit breaker includes a pair of slots 24 and a pair of slots 26 generally at the front portion 28 thereof. Each guide bracket 16 includes a pair of hook-shaped ends 30 with one hooked-shaped end 30 being received in an associated slot 24 and 26. In addition, four slots 34 are formed at the rear end 36 of the circuit breaker 12. A pair of retainer members 38 is associated with each guide bracket 16. As best shown in the exploded portion of FIG. 1, each retainer member 38 is generally C-shaped having first and second legs 40 and 42 disposed in spaced relation defining an opening 44 therebetween. The first leg 40 includes an aperture 46 therein. The second leg 42 includes a protrusion 48 extending generally transversely with respect thereto. Each of the second slots 34 is constructed to receive the protrusion 48 of an associated retainer member 38 to retain the rear portion of the associated guide bracket 16 with respect to the circuit breaker 12. Each guide bracket 16 has a portion 50 extending adjacent to a side of the circuit breaker 12 and has a flange 52 disposed transversely with respect to the extending portion 50 and disposed in the opening 44 of the retainer member 38. The flange 52 of each guide bracket includes a threaded aperture 54 therein such that a fastener 56 may be inserted through the aperture 46 in the first leg 40 of the retainer member 38 and through the threaded aperture 54 of the flange 52. The end of the fastener 56 engages the second leg 42 and forces the second leg 42 against the rear surface 36 of the circuit breaker 12, maintaining the protrusion 48 in the slot 34.

Each guide bracket 16 includes a pair of guide posts 58 which are attached to the associated guide bracket by rivets 60. The guide posts 58 may be attached in such a manner to enable rotation of the guide posts 58 with respect to the associated guide bracket 16 to define rollers. The guide posts 58 are used to guide and support the circuit breaker 12 when being drawn into or withdrawn from the plug-in base 14, as will be explained more fully below.

The circuit breaker 12 includes a toggle handle 62 and copper stabs 64 extending therefrom to be received by contact jaws 66 in the plug-in base 14 so as to electrically connect and mechanically mount the circuit breaker 12 to the plug-in base 14.

The movement structure 10 also includes components attached to the plug-in base 14. These components are shown in an exploded view in FIG. 1. Thus, the movement structure 10 includes a draw bracket assembly comprising a pair of draw brackets 68 and 70. Each draw bracket 68 and 70 has a generally planar portion 72 and a hook structure 74 at a rear end thereof. As best shown in FIGS. 1–4, the plug-in base 14 includes a pair of walls 76 extending therefrom to define a slot structure 78 for receiving an associated hook structure 74. With reference to FIGS. 24, each draw bracket 68 and 70 includes a detent 80 for engaging a surface 82 near the front of the plug-in base 14. In addition, a stand-off tab 84 is provided for spacing the associated draw bracket 68, 70 from the associated side of the plug-in base 14.

Figure 2:
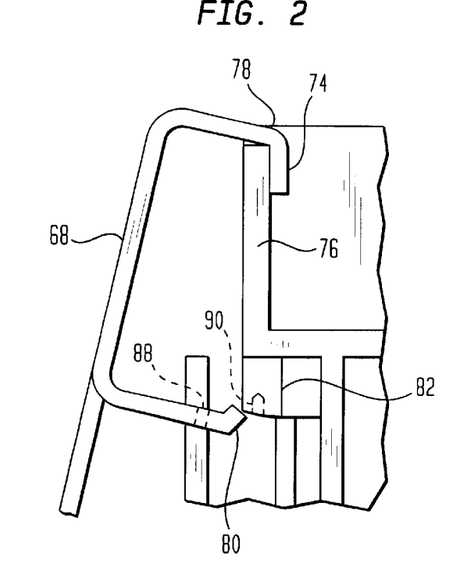
FIG. 2 is an enlarged partial plan view of hook structure of a draw bracket being joined to a plug-in base of the movement structure of FIG. 1.
Figure 3:
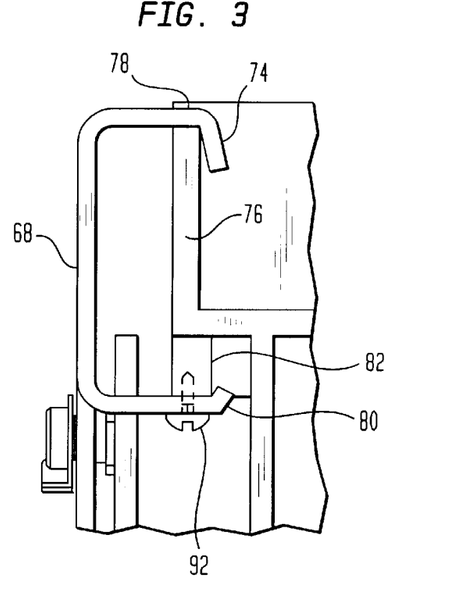
FIG. 3 is an enlarged partial plan view of the hook structure of FIG. 2 joined to the plug-in base.
Figure 4:
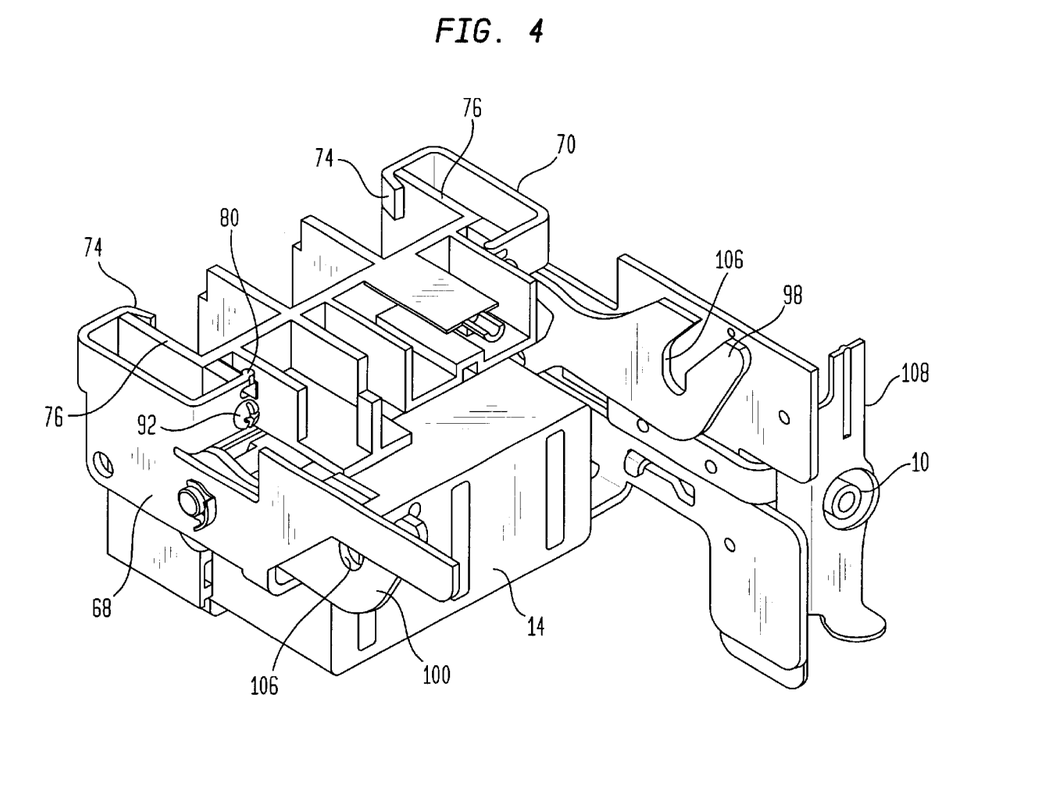
FIG. 4 is a perspective view of a lower portion of a plug-in base and draw bracket assembly of the movement structure of FIG. 1, the upper portion thereof being cut-away for clarity of illustration.

With reference to FIGS. 2–4, to install the draw bracket 68 to the plug-in base 14, the hook structure 74 is first engaged with the slot structure 78 in the rear of the plug-in base 14. The draw bracket 68 is then rotated about the hook structure 74 until the detent 80 engages the front surface 82 of the plug-in base 14 in an interference fit, locking the draw bracket 68 in position on the plug-in base 14. Rotation of the draw bracket 68 is continued until the stand-off tab 84 abuts surface 86 (FIG. 6) of the plug-in base 14. In this position, a hole 88 in the draw bracket 68 is aligned with a hole 90 in the plug-in base 14 and a screw 92 is provided in the holes 88 and 90 to complete the assembly. Hole 90 may be threaded or may be a smooth hole and a thread cutting screw may be employed. The draw bracket 70 is installed in the same manner to the opposite side of the plug-in base 14. This snap-on arrangement advantageously permits correct and precise installation of the draw brackets in the field by a single technician without the use of special tools or fixtures.

Figure 5:
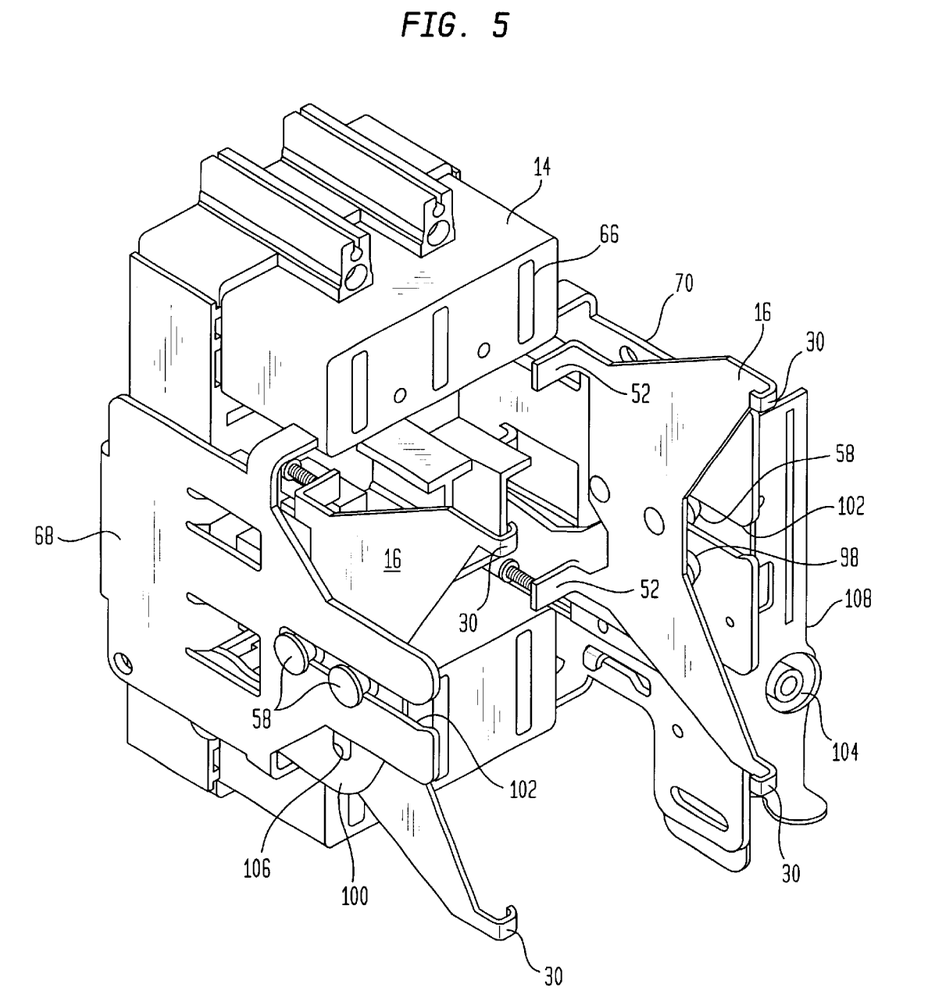
FIG. 5 is a front perspective view of the movement structure of the invention, shown with the circuit breaker removed for clarity of illustration.
Figure 6:
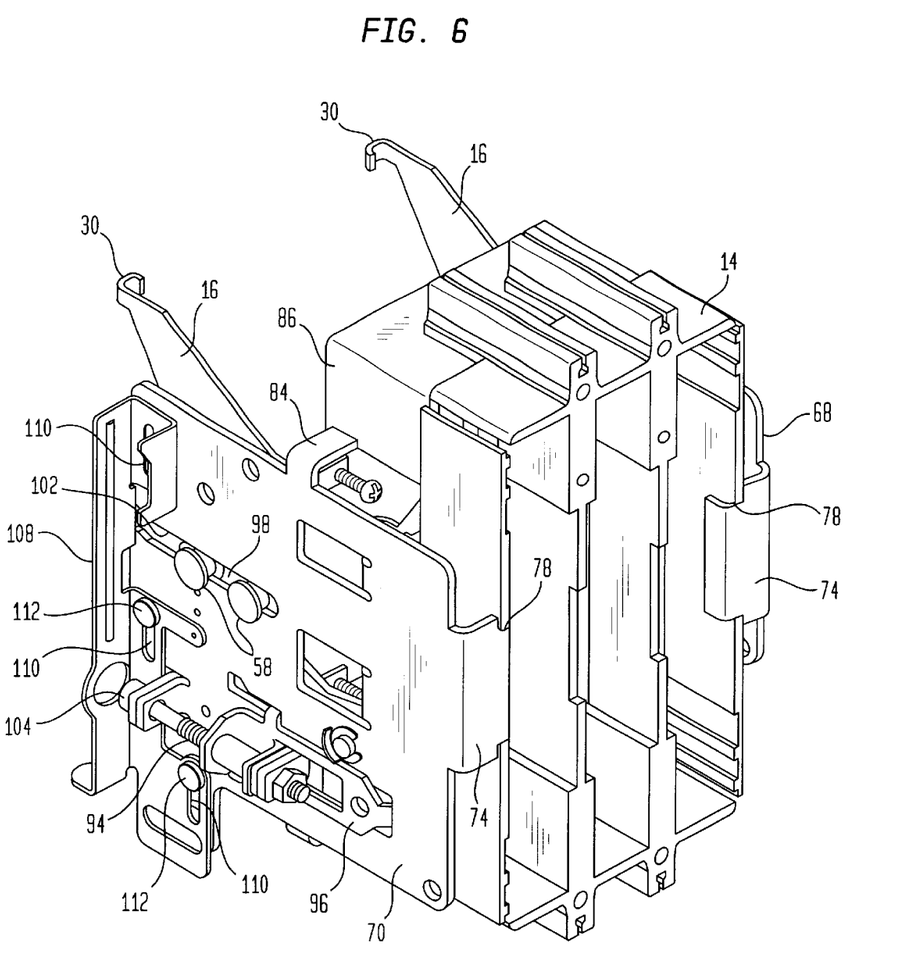
FIG. 6 is a rear perspective view of the movement structure of FIG. 5.

The draw brackets 68 and 70 provide support for the circuit breaker 12 together with circuit breaker guide brackets 16. As best shown in FIGS. 5 and 6, the active draw bracket 70 includes drive structure including a drive screw 94 and a slider 96 which actuates draw arms 98 and 100. Draw arm 98 is associated with the active draw bracket 70 while draw arm 100 is associated with the passive draw bracket 68. The draw arms 68 and 70 are operatively associated via a transfer shaft 102 (FIG. 1). The structure and operation of the drive structure and draw arms of the invention are conventional and are of the type disclosed in U.S. Pat. No. 5,837,949, the content of which is hereby incorporated into the present specification by reference. Thus, movement structure 10 operates in the following manner with reference to FIGS. 4–6. It is noted that for clarity of illustration, the circuit breaker 12 is not shown coupled to the guide brackets 16 in FIGS. 5 and 6.

First, the circuit breaker 12 is aligned with the draw brackets 68 and 70. Next, the circuit breaker 12 is guided into slots 102 of the draw brackets 68 and 70 until the guide posts 58 are resting in their free position in the draw bracket slots 102. The drive screw 94 is then rotated clockwise by engaging the head 104 thereof with a tool to insert or draw the circuit breaker 12 into the plug-in base 14. Rotating the drive screw 94 displaces the slider 96 so as to rotate the draw arms 98 and 100 upwardly. Thus, as the draw arms 98 and 100 rotate, they capture the two forward guide posts 58 in the two draw bracket slots 106 and thereby draw or pull-in the circuit breaker 12 into the plug-in base 14 so as to cause the copper stabs 64 to be inserted or drawn into the copper contact jaws 66 of the plug-in base 14.

To remove, draw-out or otherwise withdraw the circuit breaker 12 from the plug-in base 14, the head 104 of the drive screw 94 is rotated counter-clockwise so as to cause the drive screw 94 to rotate causing the slider 96 to travel rearwardly or outwardly from the draw brackets 68 and 70. This causes the draw arms 98 and 100 to rotate downwardly which draws-out and disconnects the circuit breaker 12 from the plug-in base 14.

Figure 7A:
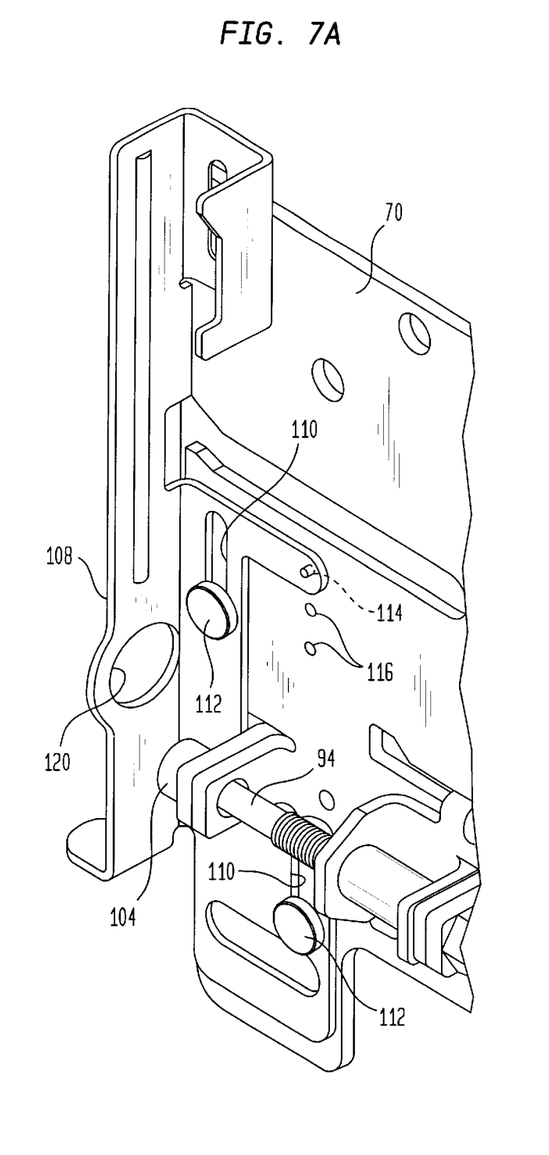
FIG. 7A is a perspective view of a three position movable rail of the active draw bracket of the movement structure of the invention shown in a first position thereof.
Figure 7B:
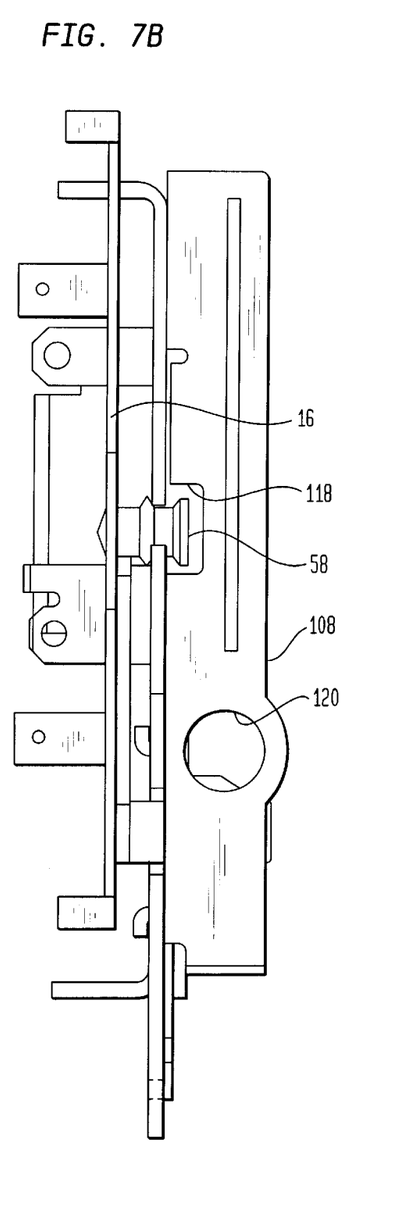
FIG. 7B is a front view of the three position movable rail of FIG. 7A.

In accordance with the principles of the invention, the active draw bracket 70 of the movement structure 10 further includes a movable structure coupled thereto so as to be moved in a linear manner between first, second and third positions while maintaining the movable structure in one of the three positions. In the illustrated embodiment and as best shown in FIG. 6, the movable structure comprises a rail 108 mounted on the front of active draw bracket 70. The rail 108 includes slots 110 which receive associated guide members in the form of shoulder rivets 112 extending from the active draw bracket 70. Thus, the rail 108 is permitted to slide vertically with respect to the rivets 112. A three position holding structure permits movement of the rail 108 between three positions while maintaining the rail 108 in a given position. In the preferred embodiment and as best shown in FIGS. 7A and 7B, the holding structure comprises a small protrusion 114 on the rail 108 which forcibly engages one of three small indentations 116 defined in the active draw bracket 70. An indentation 116 corresponds to a certain one of the three positions of the rail 108. As the rail 108 is moved from one of the three positions to another position, the protrusion 114 disengages one of the indentations 116 and engages another indentation.

With reference to FIGS. 7A and 7B, in a first position of the rail, the circuit breaker 12 may be removed from or installed in the draw brackets 68 and 70 of the plug-in base 14. A clearance cut-out 118 in the rail 108 is in a position to clear the rollers 58 on guide brackets 16. As the circuit breaker 12 is removed from the draw brackets 68 and 70, the rollers 58 pass through the clearance cutout 118. In this first position, a drive tool access hole 120 in the rail 108 is not aligned with the head 104 of the drive screw 94 so that the drive structure may not be operated.

Figure 8A:
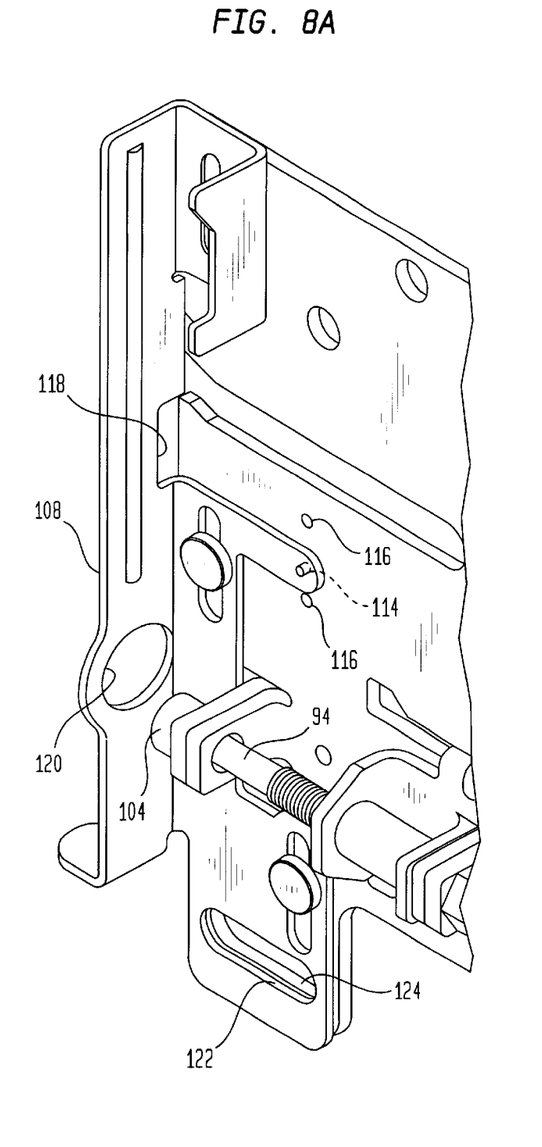
FIG. 8A is a perspective view of a three position movable rail of the active draw bracket of the movement structure of the invention shown in a second position thereof.
Figure 8B:
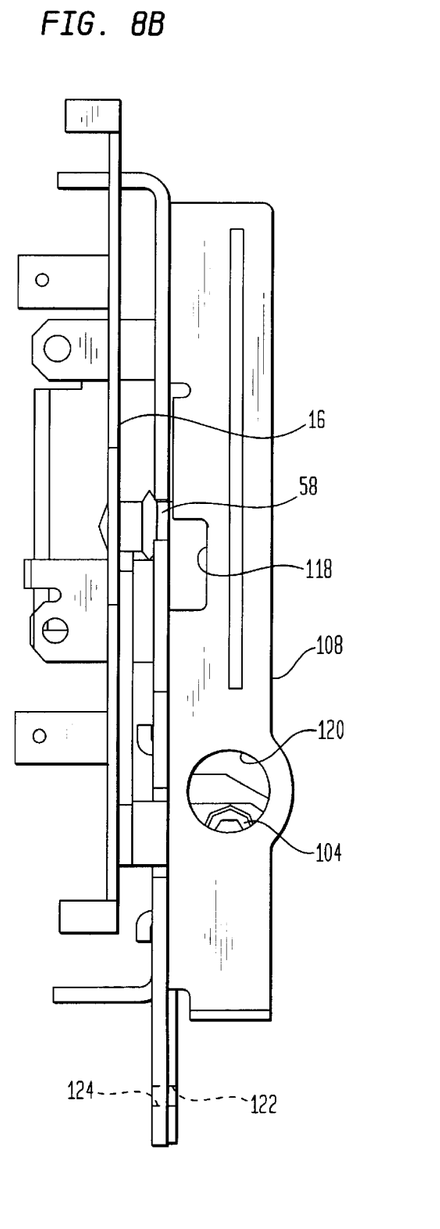
FIG. 8B is a front view of the three position movable rail of FIG. 8A.

With reference to FIGS. 8A and 8B, the second position of the rail 108 defines a locked position of the movement structure 10. In the second position, neither the clearance cut-out 118 nor the drive tool access hole 120 is in alignment with its respective component. Therefore, the circuit breaker 12 may not be inserted into or withdrawn from the draw bracket assembly (draw brackets 68 and 70) and the drive structure cannot be operated. Cooperating locking structure in the form of an aperture 122 in rail 108 and an aperture 124 in the active draw bracket 70 are aligned in the second position, allowing the structure to be locked with a locking member such as a bolt lock inserted through the apertures 122 and 124 for maintenance safety and for theft prevention.

Figure 9A:
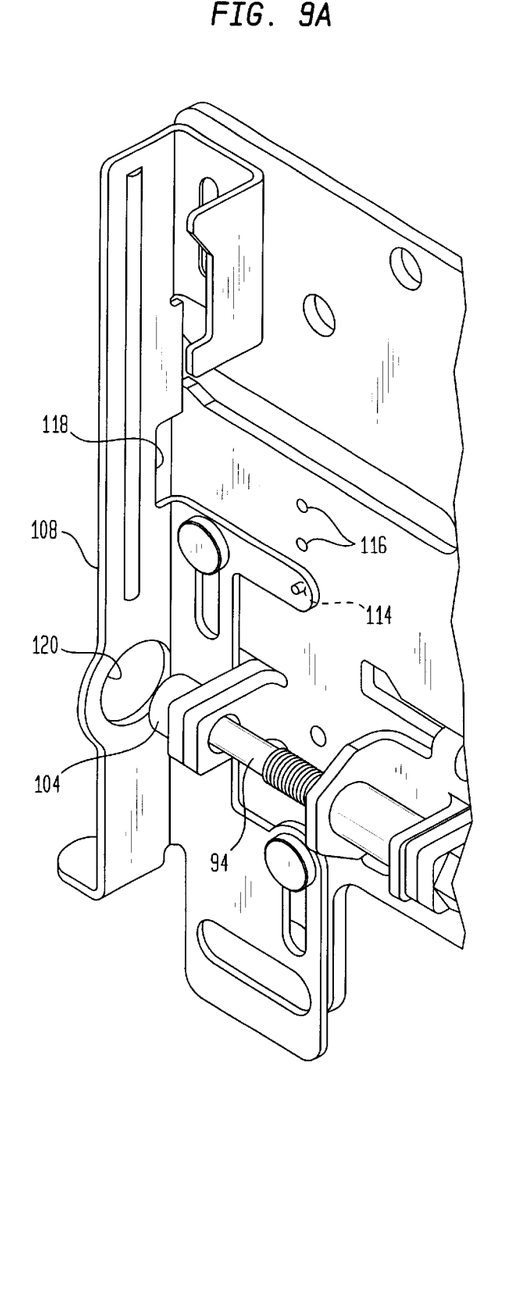
FIG. 9A is a perspective view of a three position movable rail of the active draw bracket of the movement structure of the invention shown in a third position thereof.
Figure 9B:
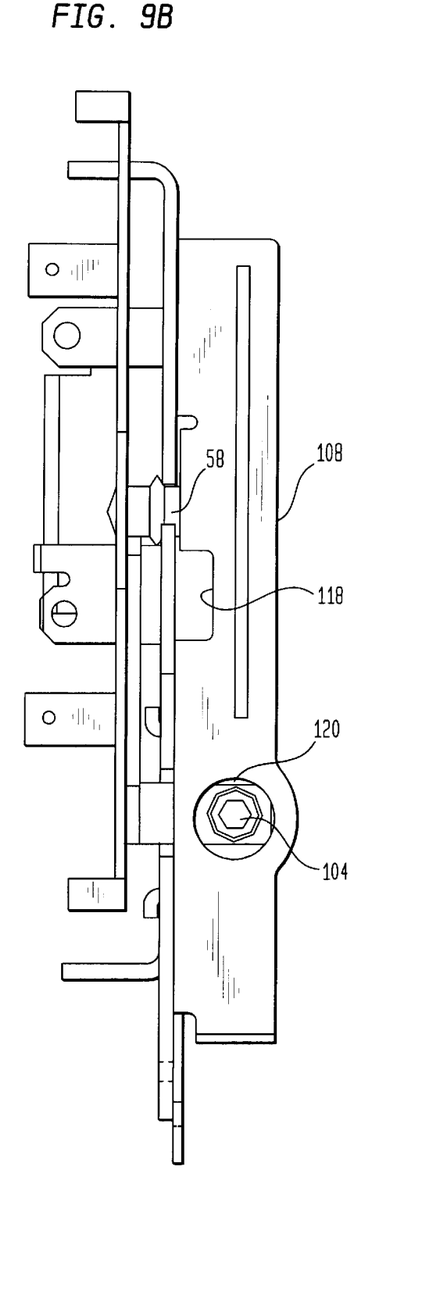
FIG. 9B is a front view of the three position movable rail of FIG. 9A.

With reference to FIGS. 9A and 9B, in a third position of the rail 108, the clearance cut-out 118 is not aligned with the path of the rollers 58, thus, the circuit breaker 12 may not be completely removed from the draw brackets 68 and 70 of the draw bracket assembly. The drive tool access hole 120 in the rail 108 is aligned with the head 94 of the drive screw 94 permitting the drive structure to be operated to insert the circuit breaker 12 into or withdraw the circuit breaker 12 from the plug-in base 14. This arrangement advantageously prevents the circuit breaker 12 from dropping after it is withdrawn from the plug-in base 14 and is released from the draw brackets 68 and 70 of the draw bracket assembly. This is especially useful in situation where plug-in bases 14 are mounted with the contact jaws 66 (FIG. 5) angled downwardly, in which case a disengaged circuit breaker 12 would otherwise drop from the plug-in base 14.

The foregoing preferred embodiments have been shown and described for the purposes of illustrating the structural and functional principles of the present invention, as well as illustrating the methods of employing the preferred embodiments and are subject to change without departing from such principles. Therefore, this invention includes all modifications encompassed within the spirit of the following claims.

What is claimed is:

1. A circuit breaker movement structure for use with a circuit breaker to move the circuit breaker to be connected with or be disconnected from a circuit breaker connecting apparatus, the circuit breaker connection apparatus having slot structure in a rear surface thereof, the movement structure comprising:
    a bracket assembly being constructed and arranged to engage with a circuit breaker to move the circuit breaker with respect to the connecting apparatus, said bracket assembly having a pair of draw brackets disposed in spaced relation, each said draw bracket including:
        hook structure constructed and arranged to engage with associated slot structure of the connecting apparatus, and
        a detent constructed and arranged to engage a surface of the connecting apparatus in an interference fit when said hook structure is engaged in said slot structure.

2. The movement structure according to claim 1, wherein each draw bracket further includes a stand-off tab constructed and arranged to space the associated draw bracket from the connecting apparatus when joined thereto.

3. The movement structure according to claim 1, wherein each of said draw brackets includes a side member constructed and arranged to be disposed adjacent to a side of the connecting apparatus, and a rear member disposed generally transversely with respect to said side member, said rear member including said hook structure.

4. The movement structure according to claim 1, in combination with a connecting apparatus constructed and arranged to engage a circuit breaker, said connecting apparatus including a surface having slot structure therein, said hook structure engaging said slot structure and said detent structure engaging a surface of said connecting apparatus in an interference fit joining said draw bracket assembly and said connecting apparatus.

5. The combination according to claim 4, wherein each of said draw brackets includes a boss having an aperture therein, and wherein a fastener extends through said aperture and engages said connecting apparatus.

6. The combination according to claim 4, wherein each of said draw brackets further includes a stand-off tab constructed and arranged to space the associated draw bracket from said connecting apparatus with said stand-off tab abutting said connecting apparatus.

7. The combination according to claim 4, wherein each of said draw brackets includes a side member disposed adjacent to a side of the connecting apparatus and a rear member disposed generally transversely with respect to said side member, said rear member including said hook structure.

8. A circuit breaker movement system for use with a circuit breaker to move the circuit breaker to be connected with or be disconnected from a circuit breaker connecting apparatus, the system comprising:
    a circuit breaker,
    a guide assembly mounted to said circuit breaker,
    a circuit breaker connecting apparatus having slot structure in a rear surface thereof,
    a bracket assembly mounted to said circuit breaker connecting apparatus and constructed and arranged to move said circuit breaker with respect to said circuit breaker connecting apparatus, said bracket assembly having a draw bracket including:
        hook structure engaged with said slot structure of the circuit breaker connecting apparatus,
        a detent engaged with a surface of the circuit breaker connecting apparatus in an interference fit, and
        a stand-off tab abutting said circuit breaker connecting apparatus and spacing said plate member from said circuit breaker connecting apparatus,
    wherein said guide assembly includes a guide constructed and arranged to be engaged by said bracket assembly such that said bracket assembly may move said circuit breaker with respect to said circuit breaker connecting apparatus.

9. The system according to claim 8, wherein said circuit breaker has a slot structure therein near a front surface thereof, and said guide assembly includes a guide bracket having a hook at an end thereof, said hook engaging said slot structure.

10. The system according to claim 9, wherein said guide bracket has a portion extending adjacent to a side of said circuit breaker and a flange disposed transversely with respect to said extending portion, said flange having a threaded aperture therein, and wherein a generally C-shaped retainer member has first and second arms in spaced relation defining an opening therebetween, said second arm including a protrusion extending transversely with respect thereto and said first arm having an aperture therein, said protrusion engaging a rear slot in a rear surface of said circuit breaker, an open portion of said retainer member receiving said flange and a screw being inserted through said aperture in said first arm and engaged with said threaded aperture in said flange such that said screw engages said second leg of said retainer member to force said second leg in contact with the rear surface of the circuit breaker and maintain said protrusion in said rear slot.

11. The system according to claim 8, wherein said guide assembly includes a bracket adjacent to a side of said circuit breaker and said guide includes a pair of rollers extending from said guide bracket, and said bracket assembly includes a movable draw bracket constructed and arranged to engage at least one of said rollers.

* * * * *